(12) United States Patent
Pope et al.

(10) Patent No.: US 8,886,031 B2
(45) Date of Patent: Nov. 11, 2014

(54) CAMERA WINDOW ASSEMBLY FOR ELECTRONIC DEVICE

(75) Inventors: Benjamin J. Pope, Sunnyvale, CA (US); Richard Hung Minh Dinh, San Jose, CA (US); Tang Yew Tan, Palo Alto, CA (US); David A. Pakula, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 173 days.

(21) Appl. No.: 13/222,999

(22) Filed: Aug. 31, 2011

(65) Prior Publication Data

US 2013/0051785 A1  Feb. 28, 2013

(51) Int. Cl.
*G03B 17/02* (2006.01)

(52) U.S. Cl.
CPC .......... *G03B 17/02* (2013.01); *G03B 2217/002* (2013.01)
USPC ...................................................... 396/535

(58) Field of Classification Search
USPC ...................................................... 396/535
See application file for complete search history.

(56) References Cited

U.S. PATENT DOCUMENTS

| | | | |
|---|---|---|---|
| 4,456,388 A | 6/1984 | Matsumoto | |
| 7,054,073 B2 | 5/2006 | Shirie | |
| 7,133,222 B2 | 11/2006 | Chintala et al. | |
| 7,477,462 B2 | 1/2009 | Shyn et al. | |
| 7,702,226 B1 * | 4/2010 | Gutierrez | 396/25 |
| 7,751,136 B2 * | 7/2010 | Sasaki | 359/830 |
| 7,923,676 B2 | 4/2011 | Kinoshita et al. | |
| 2004/0223074 A1 * | 11/2004 | Takada | 348/360 |
| 2008/0075442 A1 * | 3/2008 | Yamashita | 396/25 |
| 2008/0159734 A1 * | 7/2008 | Westerweck et al. | 396/541 |
| 2009/0219433 A1 | 9/2009 | Higuchi | |
| 2010/0269748 A1 * | 10/2010 | Yamauchi et al. | 116/266 |
| 2011/0234803 A1 * | 9/2011 | Nakajima et al. | 348/148 |
| 2012/0019905 A1 * | 1/2012 | Teraoka et al. | 359/356 |

FOREIGN PATENT DOCUMENTS

WO  WO 2010061604 A1 * 6/2010

* cited by examiner

*Primary Examiner* — Clayton E Laballe
*Assistant Examiner* — Dennis Hancock
(74) *Attorney, Agent, or Firm* — Treyz Law Group; G. Victor Treyz; Kendall P. Woodruff

(57) ABSTRACT

An electronic device may have a housing. A camera window assembly may be mounted in a hole within the housing. The housing may be formed from a structure such as a planar glass member. The hole in which the camera window assembly is formed may be circular. A mating circular trim member in the camera window assembly may be mounted in the hole. A flange structure on the trim member may help retain the trim member within the housing. A shelf portion of the trim member may receive a ring of adhesive. The camera window assembly may have a clear disk-shaped lens with planar opposing front and rear surfaces that is mounted on the shelf portion using the adhesive. An elastomeric ring may be compressed between sidewall portions of the trim member and the lens to help retain the lens within the camera window assembly.

17 Claims, 5 Drawing Sheets

CAMERA WINDOW ASSEMBLY FOR ELECTRONIC DEVICE

BACKGROUND

This relates generally to camera windows and, more particularly, to camera windows for electronic devices.

Electronic devices such as cellular telephones often contain cameras. For example, a cellular telephone may contain a camera. To permit the camera to operate properly, the surface of the cellular telephone may be provided with a camera window. The camera window may include a clear lens through which the camera may receive image light.

With conventional cellular telephone camera window designs, adhesive is sometimes used to hold the lens in place. There is potential with this type of arrangement for the lens to become dislodged if the cellular telephone is dropped or otherwise subjected to an impact event.

It would therefore be desirable to be able to provide improved camera window structures for electronic devices.

SUMMARY

An electronic device may have a housing in which a camera is mounted. A camera window assembly may be mounted in a hole within the housing to permit image light to pass to the camera from the exterior of the housing.

The housing may be formed from a structure such as a planar glass member. The planar glass member may be used to form a front or rear surface for the electronic device. The hole in which the camera window assembly is formed may be circular. A mating circular trim member in the camera window assembly may be mounted in the hole.

A flange structure on the trim member may help retain the trim member within the housing. A shelf portion of the trim member may receive a ring of adhesive. The camera window assembly may have a clear disk-shaped lens that is mounted on the shelf portion using the adhesive.

To enhance the ability of the camera window assembly to retain the lens, the camera window assembly may be provided with an elastomeric member. The elastomeric member may have a ring shape that surrounds a circular peripheral edge of the lens. The elastomeric ring may be compressed between sidewall portions of the trim member and the lens.

Further features of the invention, its nature and various advantages will be more apparent from the accompanying drawings and the following detailed description.

DETAILED DESCRIPTION

Figure 1:
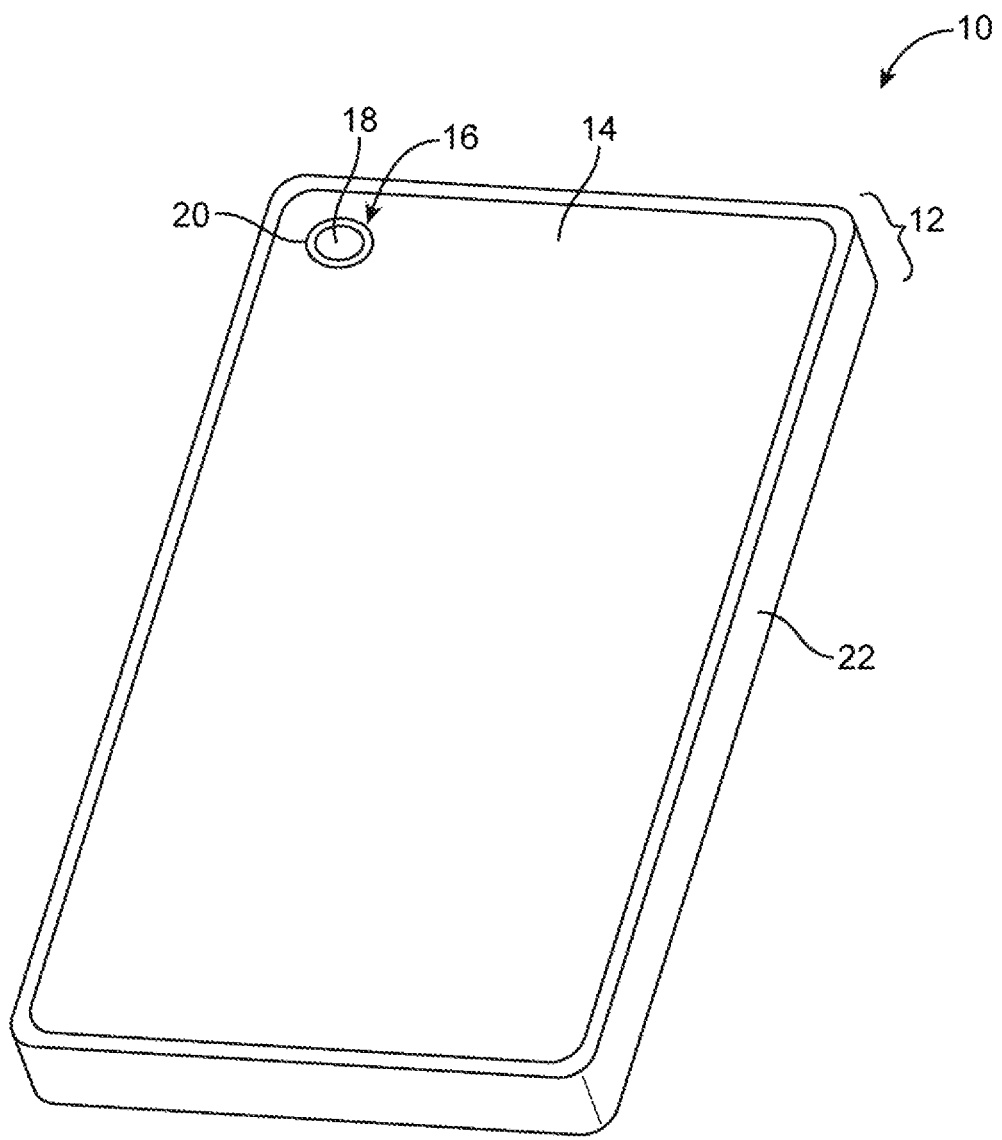
FIG. 1 is a perspective view of an illustrative electronic device of the type that may be provided with a camera window in accordance with an embodiment of the present invention.

Electronic devices such as device 10 of FIG. 1 may be provided with cameras. Device 10 of FIG. 1 may be a portable computer, a tablet computer, a computer monitor, a handheld device, game equipment, a global positioning system equipment, a cellular telephone, other portable electronic devices, or other electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. Housing 12 may be formed using a unibody configuration in which some or all of housing 12 is machined or molded as a single structure or may be formed using multiple structures (e.g., an internal frame structure, one or more structures that form exterior housing surfaces, etc.).

In some configurations, housing 12 may be formed using front and rear housing structures that are substantially planar. For example, the front and/or rear of device 10 may be formed from a planar structure (e.g., a planar housing structure) such as a planar glass member, a planar plastic member, a planar metal structure, or other substantially planar structure. A front surface of device 10 may, as an example, be covered with a display cover glass layer, a plastic display cover layer, or other planar transparent member that is associated with a touch screen display. As shown in FIG. 1, rear housing surface 14 may, if desired, be a planar member (e.g., a planar glass member) and may be surrounded by peripheral housing structures 22.

Peripheral housing structures 22 may be formed from plastic, glass, ceramic, fiber composites, metal, other materials, or combinations of these materials. Peripheral housing structures 22 may be configured to form a bezel structure that surrounds a display on the front of device 10, may be used to form vertical sidewall structures of the type shown in FIG. 1, or may be used in forming other housing structures (e.g., housing wall structures). The housing configuration of FIG. 1 is merely illustrative. Housings of other shapes (e.g., non-rectangular housings, multi-piece housings having hinges, housings having curved edges or combinations of curved and straight edges, etc.) may be used if desired.

As shown in FIG. 1, device 10 may include a camera window formed from a camera window assembly such as camera window assembly 16. Camera window assembly 16 may have a clear window structure such as lens 18. A trim structure such as trim member 20 or other supporting member may be used in mounting lens 18 in an opening in rear housing member 14 or other housing structures 12 in device 10.

Lens 18 may be formed from a clear material such as clear glass, clear plastic, or other transparent material that allows light to reach a camera module mounted within the interior of device housing 12. Lens 18 of FIG. 1 has been implemented using a transparent disk-shaped member. This is merely illustrative. Lens 18 may have a circular outline, an oval outline, a rectangular outline, an outline with a combination of curved and straight edges, or other suitable configurations. Lens 18 may have planar opposing front and rear surfaces, convex surfaces, concave surfaces, etc.

Trim member 20 may be formed from plastic, stainless steel, other metal, or other materials. With one suitable arrangement, trim member 20 may have opaque sidewalls.

The sidewalls of trim member 20 may help prevent stray light from entering the edges of lens 18. For example, in configurations for device 10 that contain a nearby flash unit, the opaque sidewalls of trim member 20 may be used to prevent stray light from the flash unit from entering lens 18 and potentially interfering with operation of the camera in device 10.

Figure 2:
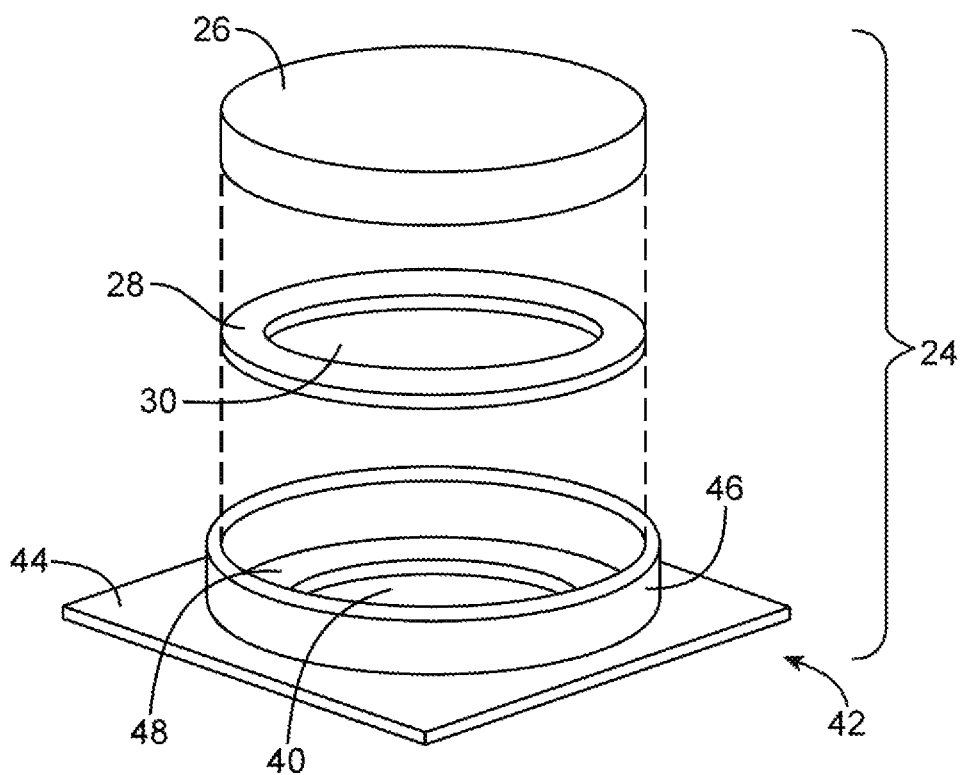
FIG. 2 is an exploded perspective view of a conventional camera window assembly.

An exploded perspective view of a conventional cellular telephone camera window assembly is shown in FIG. 2. As shown in FIG. 2, camera assembly 42 includes camera window lens 26, adhesive ring 28, and stainless steel trim member 42. Trim member 42 has flange portion 44 for retaining trim member 42 in the interior of a rear glass housing plate in a cellular telephone. Trim sidewall structures 46 may have a diameter that is configured to fit within an opening in the rear glass housing plate. Trim member 42 has circular opening 40. Adhesive ring 28 has mating opening 30. When lens 26 is mounted in trim 42, adhesive 28 attaches the peripheral portion of lens 26 to interior ledge 48 of trim member 42. Light for a camera may pass through lens 26, opening 30, and opening 40.

Figure 3:
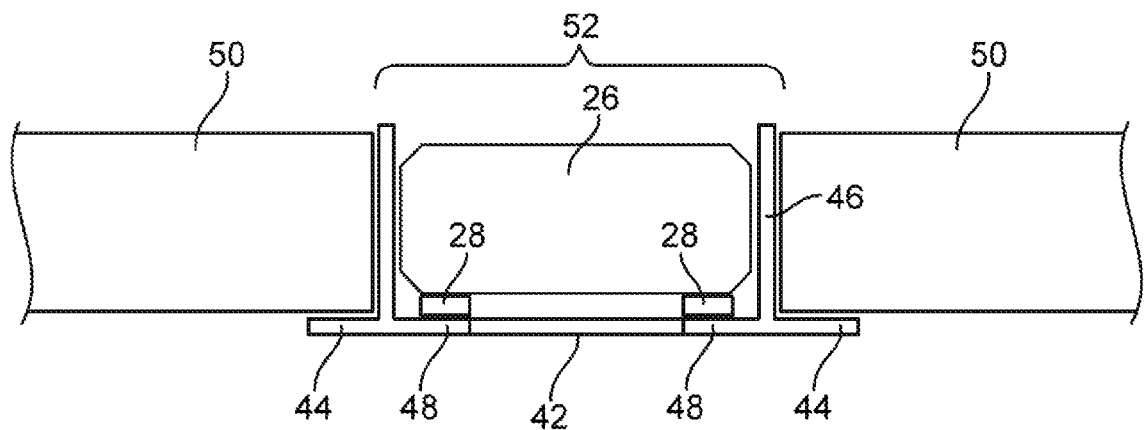
FIG. 3 is a cross-sectional side view of the conventional camera window assembly of FIG. 2 mounted in a rear housing plate in a cellular telephone.

A cross-sectional side view of conventional camera window assembly 24 of FIG. 2 mounted in opening 52 in glass housing plate 50 on the rear of a cellular telephone is shown in FIG. 3. As shown in FIG. 3, lens 26 has a diameter that allows lens 26 to be received within the cylindrical cavity formed by trim sidewalls 46. Adhesive ring 28 attaches lens 26 to portions 48 of trim member 44. Trim member flange 44 helps retain trim member 44 within housing member 50. Retention force for holding lens 26 in place is provided by adhesive 28. In the event of an unexpected drop event or other impact, this retention force may be insufficient and lens 26 may become dislodged.

Figure 4:
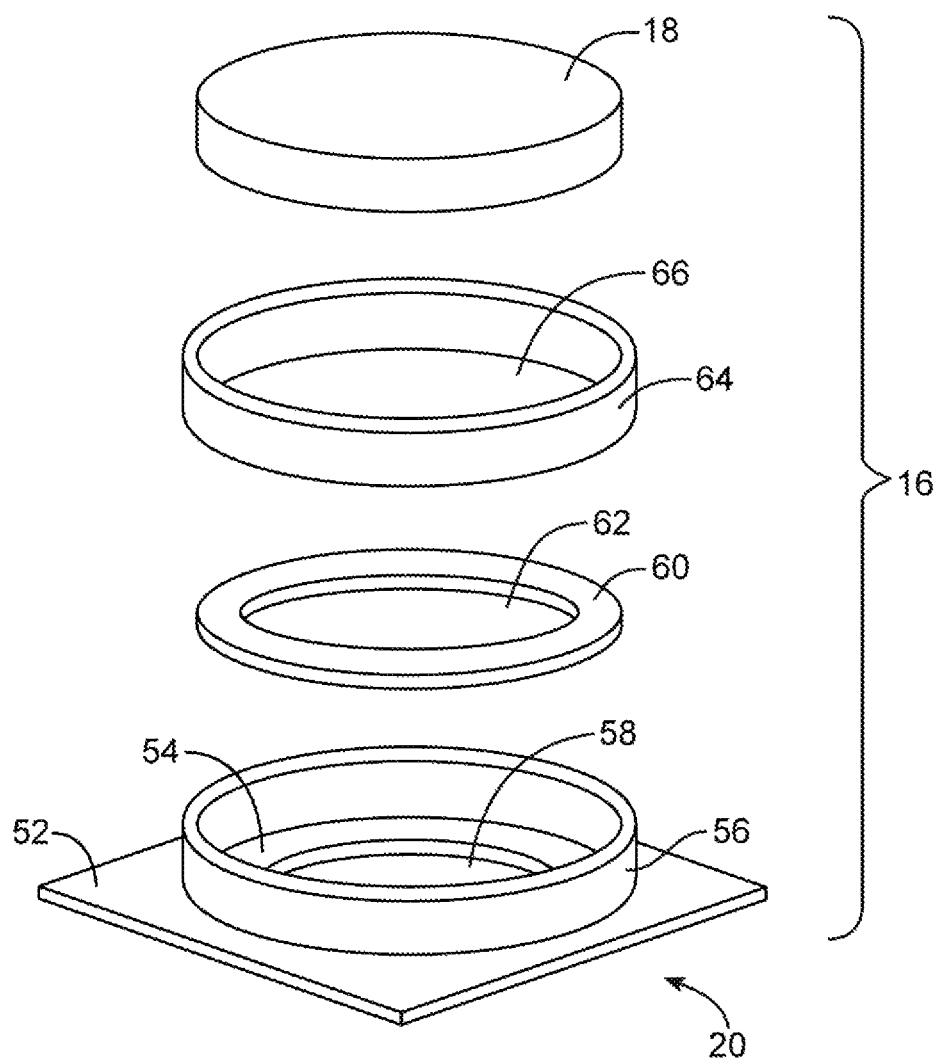
FIG. 4 is an exploded perspective view of an illustrative camera window assembly of the type that may be used in forming a camera window for an electronic device such as the electronic device of FIG. 1 in accordance with an embodiment of the present invention.

An exploded perspective view of a camera window assembly of the type that may be used in an electronic device such as device 10 of FIG. 1 is shown in FIG. 4. As shown in FIG. 4, camera window assembly 16 may include camera window lens 18, elastomeric ring 64, adhesive ring 60, and trim member 20.

Lens 18 may be formed from clear glass, clear plastic, or other transparent materials. In one illustrative configuration, lens 18 may be formed from a disk of transparent material (e.g., a disk-shaped glass or plastic member) having parallel front and rear faces and a circular outline. Lens 18 may also have other shapes (e.g., shapes with convex or concave surfaces, shapes with edges that are straight, rectangular shapes, oval shapes, shapes with combinations of straight and curved edges, etc.).

Trim member 20 may be formed from plastic, metal, ceramic, fiber-composite materials, other materials, or combinations of these materials. Trim member 20 may be formed from a single piece of material or multipart trim structures may be used. In one illustrative configuration, trim member 20 may be formed from a stainless steel member. Sidewall structures 56 may be opaque and may help block stray light. For example, sidewall structures 56 may surround lens 18 and may block stray light that is produced by a flash unit in device 10 from the camera.

Trim member 20 may have a laterally extending portion such as flange portion 52 to help retain trim member 20 within the interior of electronic device 10. Trim sidewall structures 56 may have an outer diameter that is configured to fit within an circular hole or other opening in a housing structure in device 10. For example, trim sidewall structures 56 may have a circular periphery with an outer diameter that fits within a mating circular opening of the same diameter in a rear housing structure such as planar rear housing structure 14 of FIG. 1. Planar rear housing structure 14 may be, for example, a glass plate, a glass plate covering a metal sheet, a planar plastic member, or other structure. Trim member 20 may have a circular opening such as opening 58 that surrounds the circular periphery of lens 18. During operation of device 10, image light for a camera may pass through opening 58 without being affected by stray light that may have leaked into the interior of a glass housing structure (e.g., housing structure 14) from a flash unit in device 10.

Adhesive ring 60 may have an opening such as opening 62. Opening 62 may, for example, have an inner diameter that matches the inner diameter of opening 58 in trim member 20. When the components of the camera window assembly are assembled, adhesive ring 60 may rest between shelf portion 54 (sometimes referred to as a shelf or ledge) of trim member 20 and the lower peripheral surface of lens 18 and may help hold lens 18 within trim 20 and device 10.

Camera window assembly 16 may use an elastomeric structure such as elastomeric member 64 to help hold lens 18 in place. Elastomeric member 64 may have a circular ring shape, a rectangular ring shape, other ring shapes, or other configurations. In the example shown in FIG. 4, elastomeric member 64 has been configured to form a circular elastomeric ring. As shown in FIG. 4, elastomeric ring 64 may have an opening such as opening 66. The diameter of opening 66 may match the diameters of opening 62 and 58 (as an example).

Elastomeric ring 64 may be formed from a flexible polymer. For example, elastomeric ring 64 may be formed from a thermoplastic polyester elastomer (TPE) or other material that may be compressed. When assembled, lens 18 may be received within opening 66 of elastomeric ring 64 so that elastomeric ring 64 is radially compressed between the outer edge of lens 18 and the inner surface of trim sidewalls 56. The compression of elastomeric ring 64 may create friction on the edges of lens 18 to help retain lens 18 within trim 20 and window assembly 16 during a drop event or other unexpected impact.

When lens 18 is mounted in trim member 20, light for a camera in device 10 may pass through the camera window assembly (i.e., light for the camera may pass through lens 18, opening 66, opening 62, and opening 58).

Figure 5:
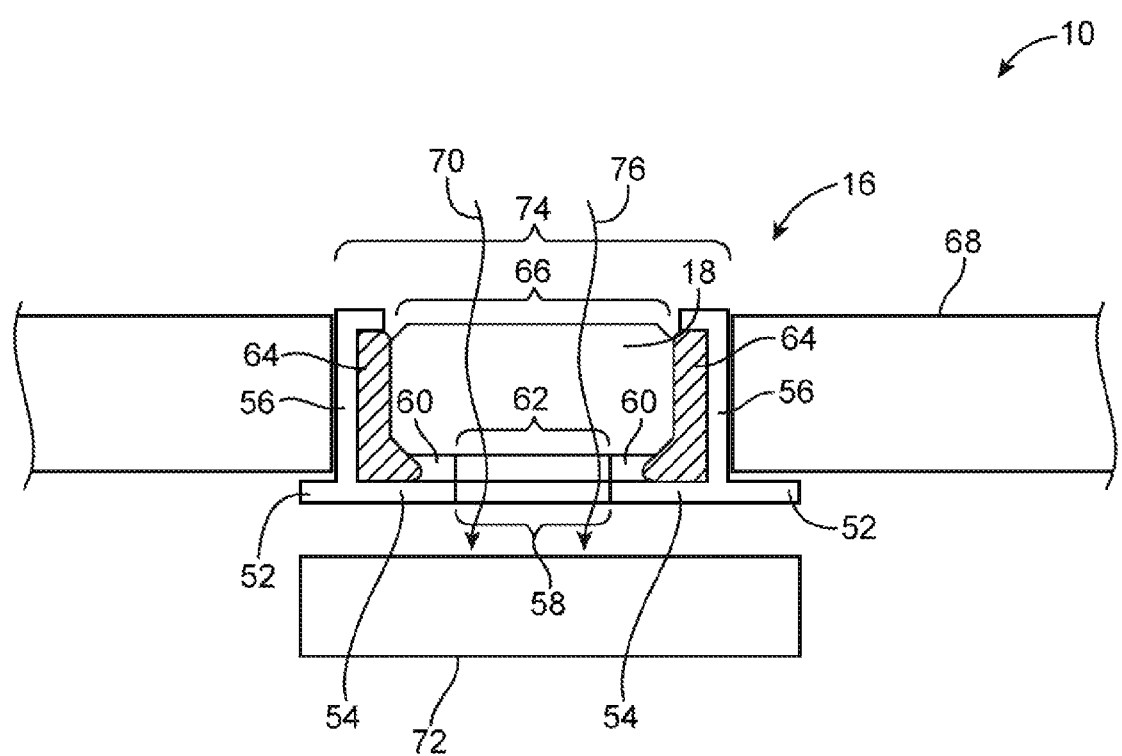
FIG. 5 is a cross-sectional side view of the illustrative camera window assembly of FIG. 4 mounted in a housing structure such as a planar rear housing member in an electronic device in accordance with an embodiment of the present invention.

A cross-sectional side view of camera window assembly 16 of FIG. 4 mounted in opening 74 in a housing structure for device 10 is shown in FIG. 5. In the example of FIG. 5, camera window assembly 16 has been mounted in a hole in a housing structure such as glass housing plate 68. In general, camera window assembly 16 may be mounted in any suitable housing structure (e.g., a plastic housing wall, a housing wall formed from a planar glass member, a housing wall having metal and plastic parts, other structures formed from glass, plastic, or other materials, etc.).

In the configuration shown in FIG. 5, image light 76 from an object may pass to camera module 72 through lens 18 and the openings in the structures of assembly 16 such as openings 66, 62, and 58. Camera module 72 may convert the image light into digital image data.

As shown in FIG. 5, lens 18 may have a diameter that allows lens 18 to be received within the cylindrical cavity formed by trim sidewalls 56. Elastomeric member 64 may be compressed between the outermost vertical surfaces at the peripheral edge of lens 18 (which press outwardly) and the opposing innermost vertical surface of trim sidewall structures 56 (which press inwardly). This may help retain lens 18 within trim member 20 and device 10. Additional lens retention force may be provided by adhesive 60, which is interposed between ledge (shelf) portion 54 of trim member 20 and lens 18. Trim member flange 52 or other suitable retention structures (e.g., lateral extension structures that protrude laterally outward from trim member 20) may be used to help retain trim member 20 within housing 12.

The foregoing is merely illustrative of the principles of this invention and various modifications can be made by those skilled in the art without departing from the scope and spirit of the invention.

What is claimed is:

1. An electronic device, comprising:
   a housing having an opening; and
   a camera window assembly in the opening that includes a trim member, an elastomeric member, and a transparent lens, wherein the elastomeric member is in contact with an outermost edge of the lens and is configured to retain the lens within the camera window assembly, wherein the trim member has a portion that covers the elastomeric member, wherein the portion forms an external surface of the electronic device, wherein the elastomeric member has opposing first and second surfaces, and wherein the trim member has a first portion that hooks over the first surface of the elastomeric member and a second portion that hooks over the second surface of the elastomeric member.

2. The electronic device defined in claim 1 wherein the transparent lens comprises a disk-shaped lens having opposing planar surfaces and wherein the elastomeric member comprises an elastomeric ring.

3. The electronic device defined in claim 1 wherein the trim member has sidewalls, wherein the elastomeric ring is interposed between the sidewalls of the trim member and the outermost edge of the lens, and wherein the trim member and lens are configured to compress the elastomeric ring.

4. The electronic device defined in claim 3 further comprising a camera module that is configured to receive light through the lens.

5. The electronic device defined in claim 4 wherein the housing comprises a planar glass member and wherein the opening is formed in the planar glass member.

6. The electronic device defined in claim 5 wherein the camera window assembly further comprises a ring of adhesive interposed between a peripheral surface of the lens and a shelf portion of the trim member.

7. The electronic device defined in claim 1 wherein the camera window assembly comprises a metal member and wherein the elastomeric member is compressed between the metal member and the lens.

8. The electronic device defined in claim 1 wherein the housing comprises a planar glass member in which the opening is formed.

9. A camera window assembly, comprising:
   a member having an opening;
   an elastomeric ring in the opening; and
   a lens that is retained within the member at least partly by the elastomeric ring, wherein the lens has peripheral sidewalls, wherein the elastomeric ring is in contact with the peripheral sidewalls, wherein the elastomeric ring has opposing first and second surfaces, wherein the trim member has a first portion that hooks over the first surface of the elastomeric ring and a second portion that hooks over the second surface of the elastomeric ring.

10. The camera window assembly defined in claim 9 wherein the lens has planar opposing front and rear surfaces, wherein the member comprises a sidewall portion with an inner surface, and wherein the elastomeric ring is compressed between the sidewall portion and the lens.

11. The camera window assembly defined in claim 10 wherein the member comprises a metal trim member with a flange and wherein the opening comprises a circular opening defined by the inner surface of the sidewall portion.

12. The camera window assembly defined in claim 9 further comprising adhesive interposed between the lens and the member.

13. The camera window assembly defined in claim 12 wherein the adhesive comprises a ring of adhesive.

14. Apparatus, comprising:
   a planar structure having a hole; and
   a camera window assembly in the hole, wherein the camera window assembly has a member with an opening, a lens in the opening, and an elastomeric lens retention member that is compressed between and in contact with the member and an outermost edge of the lens, wherein the elastomeric lens retention member has a rectangular cross section, wherein the member has a vertical sidewall surface interposed between upper and lower planar surfaces, wherein the vertical sidewall surface is parallel to the outermost edge of the lens, and wherein the elastomeric lens retention member is in contact with the vertical sidewall surface, the upper planar surface, and the lower planar surface of the member.

15. The apparatus defined in claim 14 wherein the planar structure comprises a glass plate.

16. The apparatus defined in claim 15 wherein the glass plate forms a rear housing structure in an electronic device, wherein the member comprises a metal trim member having sidewalls, and wherein the elastomeric lens retention member comprises an elastomeric ring compressed between the sidewalls and the lens.

17. The apparatus defined in claim 14 wherein the metal trim member comprises a shelf portion, the apparatus further comprising adhesive that attaches the lens to the shelf portion.

* * * * *